United States Patent Office 2,981,654
Patented Apr. 25, 1961

2,981,654
INSECTICIDAL REPELLENT
Willis Nels Bruce, Champaign, Ill., assignor to
Lee Ratner, Miami Beach, Fla.
No Drawing. Original application Jan. 31, 1958, Ser.
No. 712,333. Divided and this application Jan. 19,
1960, Ser. No. 3,281
5 Claims. (Cl. 167—22)

This application is a division of my copending application Serial No. 712,333, filed January 31, 1958, now Patent No. 2,967,798.

This invention relates to an insect control composition and has more particular reference to a combination of insecticide and insect repellent for protection against insects.

In my copending application, Serial No. 570,696, filed March 12, 1956, now Patent No. 2,937,969, entitled Fly Repellent, I have disclosed as the active ingredient of a novel insect repellent di-n-butyl succinate and other n-propyl and n-butyl diesters of maleic, fumaric, and succinic acids, all having the desired repellent characteristics and persistence. That application is directed to the combination of such repellents with certain materials among which may be mentioned piperonyl butoxide, isosafrole, and various unsaturated fatty acids and fatty esters, which exert a synergist effect upon the repellents.

I have discovered that combinations of those repellents with certain insecticides, such combinations being hereinafter sometimes called insecticidal repellents, produce a synergistic interaction providing not only relatively rapid insecticidal action with a residual repellency surviving such action, but also repellency and toxicity in the combination which are substantially greater, respectively, than the repellency of the repellent and knock-down properties of the insecticide combined therewith when used separately.

I have found that any of methoxychlor, DDT (p,p'-dichloro-diphenyl-trichlorethane), "Perthane" (diethyl diphenyl dichloroethane), or other chlorinated hydrocarbon insecticides, when combined with the repellent, result in an insecticidal repellent having the advantageous interaction between the repellent and insecticide and, to a greater or lesser degree, the stabilizing effect just mentioned above.

An object of the invention is the provision of a novel insecticidal repellent which is of great value in protecting cattle, horses, hogs, and other animals from insect attack. It is also exceedingly useful in the home in reducing the number of house flies, mosquitoes, cockroaches, ants, silverfish, and other annoying insects.

The invention is also useful in the preservation of stored grain and other products subject to insect damage in storage. The novel insecticidal repellent is exceedingly effective in controlling insects in barns and other buildings where flies and the like breed profusely and prove highly annoying and from which dirt, contamination, and disease are spread. In short, the composition prepared in accordance with my invention may be employed in any situation where insecticides or repellents are now used.

Another object of the invention is the provision of an insecticidal repellent wherein certain insecticides, contained in a composition prepared in accordance with my invention, are now useful where such insecticides alone are dangerous.

The use of certain exceedingly effective insecticides is dangerous or forbidden for many purposes. For instance, the list of insecticides permitted for the control of flies on dairy animals or in dairy barns is highly restricted because of danger to the animal itself or because of the possibility of the insecticide being transmitted into the cow's milk and so to the consumer. The use of certain insecticides is likewise hazardous in conjunction with meat animals in that the meat derived therefrom may carry insecticidal residues to the human consumer.

A further object of the invention is the provision of an insecticidal repellent wherein a substantially smaller quantity of insecticide is required for the performance of a desired insecticidal function and the chance, therefore, of danger to the animal or to the human consumer is greatly diminished. The approved insecticides may therefore be used without painstaking control of quantity, and the prospects of other more hazardous insecticides being approved for use on animals are good.

Other objects and advantages of my invention will be apparent from the following description thereof, and the invention consists in the combination of one or more of the above-identified repellents with one or more of the above-identified insecticides to provide an insecticidal repellent which has greater repellency or knock-down properties than the same quantities of the repellent and insecticide in the insecticidal repellent respectively have when used alone.

As will be understood by those skilled in the art, the effectiveness of an insecticide or repellent depends on the amount or concentration of active material deposited on a given area or, in other words, on the quantity which a fly or other insect will encounter on a cow or in a barn, or in a house.

The novel composition is prepared preferably as a solution or mixture of the repellent and insecticide in or with a suitable vehicle, carrier, or diluent. The proportions employed are such as to leave on the treated surface the desired amount or concentration of the insecticidal repellent when the directions for application of the insecticide-repellent solution have been followed. Specimen solutions are, for back rubbers and oil spray concentrate, about 20% insecticidal repellent and 80% "No. 9" oil, kerosene, or other suitable mineral or vegetable oil; for an oil spray solution, I employ 0.5% combined insecticide and repellent and the balance, "No. 9" oil or the above stated equivalent thereof. In the event it is desired to make an oil spray from the concentrate, the concentrate may be further diluted from about 20 to about 40 times with "No. 9" oil or its equivalent. An appropriate emulsion concentrate is about 20% of combined insecticide and repellent and about 10% of Atlox 1045A (polyoxyethylene sorbitol esters of mixed oleic and lauric acids) or other emulsifier, and balance "No. 9" oil. In use, the emulsion concentrate may be diluted from about 5 to about 40 times with water.

For the sake of brevity I have herein used the term "synergism." While I believe this term is aptly employed in the description of my invention, the term "potentiation of action" has occurred to me as being less restrictive. It will be appreciated that the improved effectiveness of the novel composition may be attributable in part, at least, to the preservative effect which the repellents exert on certain of the insecticides. Mere preservation or stability of the insecticide is not, however, adequate to account for the improved repellency or for the augmented knock-down effects of the composition when compared with the repellency of the repellent and the knock-down effects of the repellent and insecticide, respectively, when used alone. Another part, therefore, of the improved activity may be attributable to biological factors. Possibly the improved performance may be attributable in part to still further factors of which I have no knowledge. The fact remains, however, that a cooperative effect is noticed between the insecticide and repellent which amply justifies the use of the term "synergism."

In discussing the efficacy of the novel insecticidal repellent reference will hereinafter be made to knock-down time and repellency. Knock-down time is determined by enclosing a counted number of flies in a Petri dish having a filter paper therein impregnated with a stated quantity of a stated impregnant in terms of milligrams per square foot. The efficacy of the impregnant then is measured in terms of the minutes taken to achieve 100% knock-down of the flies.

Repellency is determined by folding filter papers impregnated with the stated quantity of impregnant in terms of milligrams per square foot so as to form a free-standing shallow conical cup. Weighed lactose pellets are then placed in the bottom of each of the cups or inside the apex of the cone.

An exposure cage is provided with a horizontal turntable in it and a plurality of treated cups are deposited on the turntable about the rim thereof. Illumination and a source of water are likewise provided in the cage. Among the filter papers is included a check or control pellet in an untreated cup.

Flies are introduced into the cage on the basis of approximately 150 flies per cup. The turntable is rotated slowly. At the end of a measured period of time, or at about that time when the check or control pellet is totally consumed, the filter papers are withdrawn from the cage and the pellets remaining dried and weighed. Repellency is expressed as the percentage which the end weight of the pellet associated with any particular impregnant bears to the initial weight of the pellet.

In the following table the term "repellent" refers to the n-butyl diester of succinic acid.

*Repellent and DDT*

| Mgs. | | Percent Repellency of Combination | Knock-down time of Combination (minutes) |
| --- | --- | --- | --- |
| R | I | | |
| 11 | 0 | 82.0 | 0 |
| 10 | 1 | 85.0 | 45 |
| 8 | 3 | 93.0 | 11 |
| 5 | 5 | 90.0 | 15 |
| 3 | 8 | 36.0 | 22 |
| 0 | 11 | 0 | 32 |

Comparable results were obtained where methoxychlor and "Perthane," respectively, were substituted for the DDT in the insecticidal repellent. The presently preferred proportion where any of those chlorinated hydrocarbon insecticides is employed in the novel insecticidal repellent is about 75% repellent and about 25% insecticide by weight of the combination, acceptable results being obtained where the repellent makes up from about 2% to about 99.5% and the insecticide makes up from about 98% to about 0.5% by weight of the combination.

Field tests were made by means of a back rubber of various formulations of methoxychlor with the repellent. The materials were tested in relative proportions of from about 50% to about 84% methoxychlor and from about 50% to about 16% repellent. All compositions gave excellent results and the 16% repellent to 84% insecticide combination gave the particularly notable results of 100% control of horn flies and 88% control of horse flies over a period of thirty days. Untreated control animals were infested with an average of 1,475 horn flies and about five horse flies per head.

It will be apparent from the foregoing description that the combination of repellents of the character here involved together with the above disclosed insecticides gives altogether unsuspected and unforeseen results in augmenting the repellency of the repellent and the toxicity of the insecticide and maintaining the effectiveness of the components in both respects over a substantially prolonged period of time. The economic consequences of my invention are important. Protection against insect attack for animals, households, stored grains, persons, etc., is more easily, more effectively, and more permanently achieved at lower cost. This protection is achieved with greater safety in that the enhanced effectiveness of the insecticidal components which are in many cases toxic to some degree to animals and humans, makes possible the use of materially reduced quantities thereof. Of all the tested insecticides in combination with the repellent, I have found the repellency and, in a great majority of instances, the insecticidal effectiveness as well to be greatly improved.

It is thought that the invention and its attendant advantages will be understood from the foregoing description, and it will be apparent that various changes may be made in the combination and ingredients thereof without departing from the spirit and scope of the invention or sacrificing all of its material advantages, the forms hereinbefore described being merely preferred embodiments thereof.

I claim:

1. An insecticidal repellent comprising a combination of from about 0.2% to about 99.5% by weight of di-n-butyl succinate and from about 98% to about 0.5% of a chlorinated insecticide selected from the group consisting of dichloro diphenyl trichloroethane, diethyl diphenyl dichloroethane, and methoxychlor.

2. An insecticidal repellent comprising a combination of di-n-butyl succinate and dichloro diphenyl trichloroethane wherein said succinate makes up from about 98% to about 2% and said dichloro diphenyl trichloroethane makes up from about 2% to about 98% by weight of said composition.

3. An insecticidal repellent comprising a combination of di-n-butyl succinate and dichloro diphenyl trichloroethane wherein said succinate makes up about 73% and said dichloro diphenyl trichloroethane makes up about 27% by weight of the combination.

4. An insecticidal repellent composition comprising a combination of di-n-butyl succinate and methoxychlor wherein said succinate makes up from about 50% to about 16% and said methoxychlor makes up from about 50% to about 84% by weight of said combination.

5. An insecticidal repellent solution comprising a combination of di-n-butyl succinate and methoxychlor wherein said succinate makes up about eight parts and said methoxychlor makes up about three parts by weight of said combination.

References Cited in the file of this patent

King: U.S. Dept. Agr. Handbook No. 69, pp. 145, 230, 316 (May 1954).

Hanna: Handbook of Agr. Chem., 2nd Ed., 1958, p. 321.

Smith: Jour. Eco. Ent. 42, June 1949, pp. 439–440.